United States Patent [19]
Gebhardt

[11] 4,262,589
[45] Apr. 21, 1981

[54] APPARATUS FOR EMBOSSING AND PRINTING INFORMATION ON CHARGE SALES SLIP

[76] Inventor: Robert G. Gebhardt, Franklin Park, Ill.

[21] Appl. No.: 1,531

[22] Filed: Jan. 8, 1979

[51] Int. Cl.³ .......................... G06K 15/02; B41F 3/04
[52] U.S. Cl. ...................................... 101/45; 101/269; 101/93.12; 235/379; 235/433
[58] Field of Search ................ 101/45, 56, 269, 93.12, 101/DIG. 18, 426; 235/379–382, 432–433; 340/149 R, 149 A

[56] References Cited
U.S. PATENT DOCUMENTS

| | | | |
|---|---|---|---|
| 3,356,021 | 12/1967 | May et al. | 101/45 X |
| 3,402,662 | 9/1968 | Blair et al. | 101/45 X |
| 3,514,754 | 5/1970 | Schwend | 101/45 X |
| 3,544,769 | 12/1970 | Hedin | 235/379 |
| 3,628,452 | 12/1971 | Shaw | 101/90 |
| 3,837,570 | 9/1974 | Ginsburgh | 235/433 |
| 3,859,509 | 1/1975 | Dillingham et al. | 101/DIG. 18 |
| 4,027,142 | 5/1977 | Paup et al. | 235/379 X |
| 4,166,945 | 9/1979 | Inoyama et al. | 235/381 X |

*Primary Examiner*—Edward M. Coven
*Attorney, Agent, or Firm*—Merriam, Marshall & Bicknell

[57] ABSTRACT

Apparatus for embossing and imprinting information on credit card sales slips in a manner compatible with fully automatic data processing, including a movable magnetic read head mounted to an embossing mechanism for reading the customer information from a magnetic stripe on the credit card during the embossing operation, and means for temporarily storing the information. An impact printer movably mounted below the sales slip pack is positioned to imprint the complete transaction information in a form compatible with existing automatic character recognition apparatus. The reverse side of the credit card issuer's copy of the credit card sales slip is printed with scannable print font setting forth the customer's identification, merchant's identification, sale amount, transaction date, etc., so as to be automatically readable by existing optical character recognition (OCR) or magnetic ink character recognition (MICR) apparatus. Microprocessor means are included for controlling the information flow as received from the magnetic stripe reader, from storage means containing the merchant identification information, and from input means providing the sale amount and transaction date, and for directing the impact printer during printing of the corresponding information on the bottom of the lowermost sales slip in the pack.

2 Claims, 8 Drawing Figures

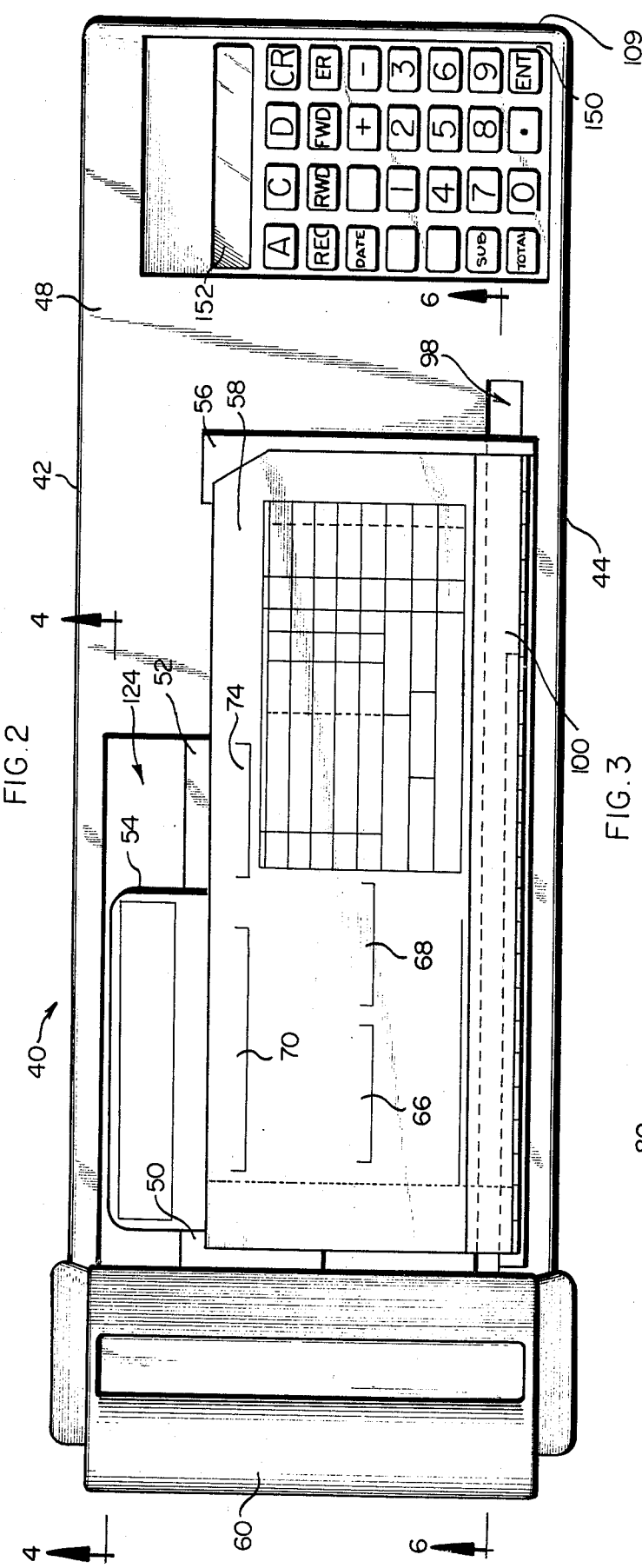
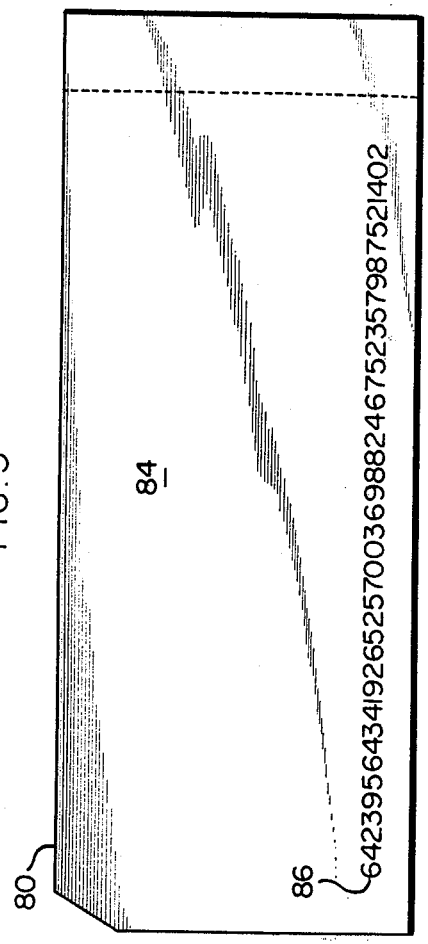
FIG. 2
FIG. 3

APPARATUS FOR EMBOSSING AND PRINTING INFORMATION ON CHARGE SALES SLIP

This invention relates to apparatus for preparing credit card sales receipts, and in particular to apparatus for embossing and printing the transaction information on such receipts in a machine readable form compatible with automatic data processing equipment used to prepare the customer's billing.

BACKGROUND OF THE INVENTION

Reference may be made to the following U.S. patents of interest U.S. Pat. Nos.: 3,544,769; 3,628,452; 3,693,156; 3,837,570; and 3,859,509.

In typical credit card sales transactions, the customer's credit card is placed on a manual embossing unit containing the appropriate merchant's identification. A standard group of sales slips containing respective copies for the merchant, the customer and an associated credit card issuer is placed in the embossing unit above the credit card. The sales clerk enters any other information desired, such as the sale amount, date of sale, etc., and upon movement of a manual embosser each front face of the respective copies is imprinted so as to contain all of the information necessary for preparing monthly customer billings.

Generally, in the preparation of such monthly billings, an operator at the credit card issuer's processing facility reads the information for each sales transaction from the credit card issuer's copy and inserts this information into automatic data processing equipment. The automatic data processor then collates the information and prints the customer billing statement which typically may include several sales transactions. The increasing use of credit card sales transactions has led to a substantial delay in preparing and forwarding the customer billing, thus leading to accompanying delays in payments to the credit card issuers. It is therefore extremely desirable to reduce as much as possible the time presently required for preparing a respective customer billing statement.

Currently, attempts at reducing this turnover time, i.e., the period of time existing between the sale transaction and the customer's payment, have concentrated on using optical character recognition (OCR) equipment which ideally can read characters and automatically process the sales slips. However, in virtually all currently existing embossing/printing apparatus for preparing credit card sales slips, the front face of the credit card issuer's containing the transaction information consists of a second or third level carbon impression. This results in about 15-50% of the sales slips being rejected by the existing OCR equipment because of incomplete or illegible numbers. Ideally, the OCR equipment should only require about 5% rejects. However, the now standardized, relatively inexpensive embossing/printing mechanism used at the point of sale with existing credit card sales slips simply cannot provide any better than the present 15-50% reject percentage using OCR equipment at the credit card issuer's processing center.

This seemingly undesirable reject ratio is somewhat tolerated because of the significant difference in the number of transactions that can be handled by OCR automatic equipment as compared to manual entry. As an example, OCR and MICR (magnetic ink character recognition) automatic processing equipment is capable of handling about 10,000 to 70,000 documents per hour respectively, whereas only about 300 documents can be handled by using manual entry of the transaction information. Thus, even with 15-50% rejects it becomes desirable to utilize as much as possible the OCR or MICR equipment and thereafter utilize manual entry for those documents which have been rejected.

Thus, it is extremely desirable to reduce the number of the rejects so that as many credit card issuer's copies of the sales slip as possible can be handled by existing OCR or other types of automatic data processing equipment.

SUMMARY OF THE INVENTION

In accordance with the principles of the present invention, there is provided apparatus for embossing and imprinting information on credit card sales slips in a manner compatible with fully automatic data processing. Thus, the presently used respective sales slip prepared by the apparatus of the present invention can be fully, automatically processed without the need for any manual entering of information as required in present systems.

Embossing and printing apparatus of the present invention includes means for embossing and printing a standard pack of sales slips with information from the customer's credit card and the merchant's identification. A movable magnetic read head mounted to the embossing mechanism reads the customer information from a magnetic stripe on the credit card during the embossing operation, and means are provided for temporarily storing the information. An impact printer movably mounted below the sales slip pack is positioned to imprint the complete transaction information in a form compatible with existing automatic character recognization apparatus. In the preferred embodiment of the invention, the reverse side of the credit card issuer's copy of the credit sales slip is printed with scannable print font setting forth the customer's identification, merchant's identification, sale amount, transaction date, etc., so as to be automatically readable by existing optical character recognition (OCR) or magnetic ink character recognition (MICR) apparatus. Microprocessor means are included for controlling the information flow as received from the magnetic stripe reader, from storage means containing the merchant identification information, and from input means providing the sale amount and transaction date, and for directing the impact printer during printing of the corresponding information on the bottom of the lowermost sales slip in the pack. Utilizing the present invention sales slips can be reliably, automatically processed by OCR equipment with reject percentages approaching the ideal 5% level.

BRIEF DESCRIPTION OF THE DRAWINGS

FIG. 2 is a plan view of an embosser and printing apparatus illustrating a manual embosser for embossing the standard credit card sales slips with the merchant's identification and with the customer's identification from an associated charge card;

FIG. 3 illustrates the bottom side of the standard pack of sales slips showing the sales transaction information in machine readable form;

FIG. 8 schematically illustrates in block diagram form the control elements for sequentially controlling the operation of the apparatus during embossing and printing.

DETAILED DESCRIPTION

Figure 1:
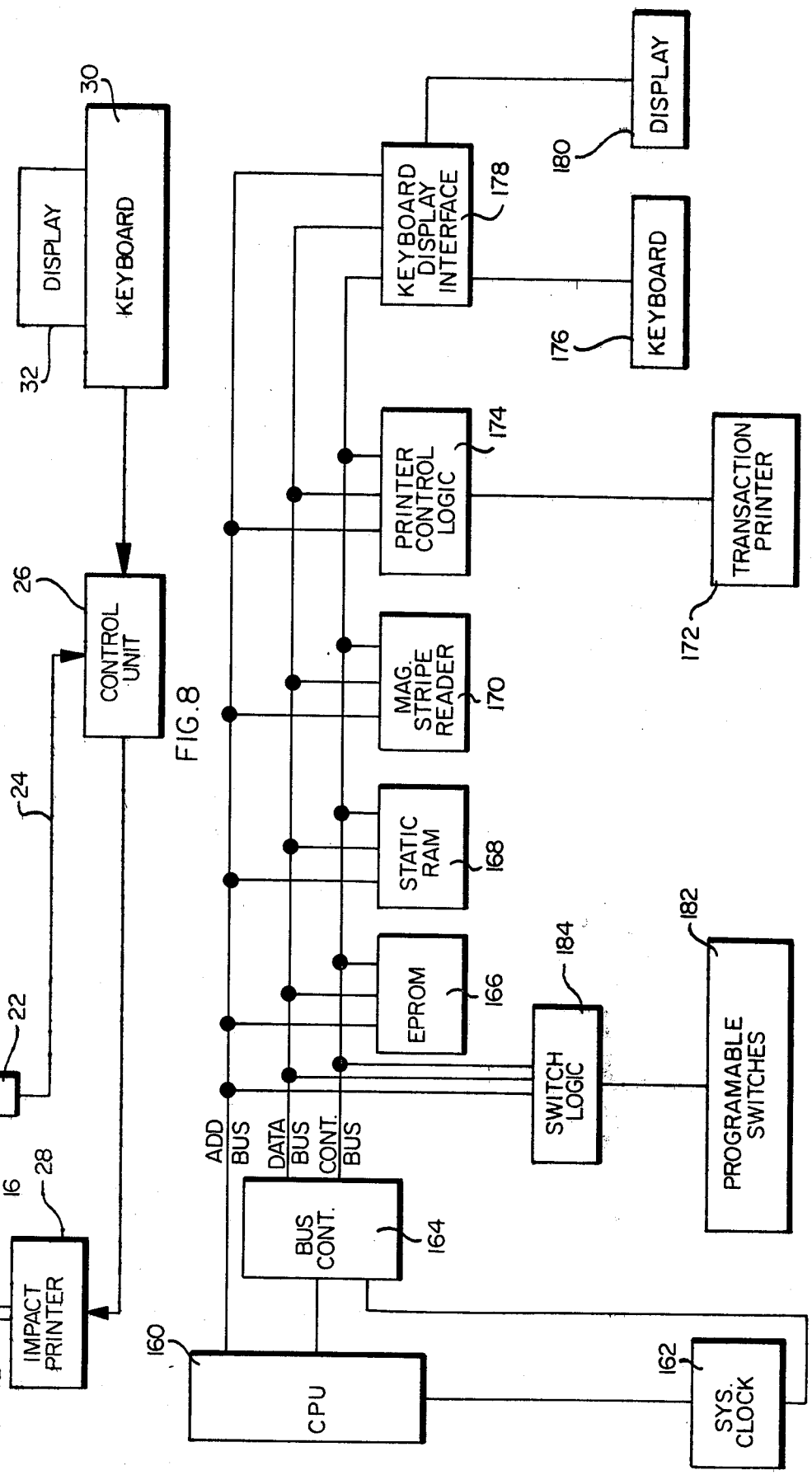
FIG. 1 schematically illustrates in block diagram form apparatus for preparing credit card sales receipts in accordance with the present invention.

FIG. 1 illustrates the overall method and apparatus aspects of the present invention. As shown in FIG. 1, a standard pack of credit card sales slips 10 including one or two thin, onion skin upper copies for the merchant and customer and a lower somewhat thicker credit card issuer's copy 12 is positioned above a customer credit card 14. The credit card has a raised portion 16 containing the customer's identification such as name, account number, etc., and a magnetic stripe 18 on the reverse side containing the same information in magnetically readable form. A manual embosser 20 is movable across the sales slips and credit card for embossing and printing the customer information in a conventional manner on the front face of each sales slip copy.

During movement of the manual embosser 20, a movable magnetic read head 22 scanningly reads the customer information on magnetic stripe 18. This information is coupled on line 24 to a control unit 26 for activating an impact printer 28 to print the customer information in a machine readable form on the bottom or the reverse side of the credit card issuer's copy 12 on the sales slips. A keyboard 30 can be used to enter the sale amount into control unit 26 for printing this information in machine readable form adjacent the customer information. As the information is entered in keyboard 30, it is illustrated on display 32 so that any errors can be corrected prior to transmitting the information. The sales amount may be emboss printed on the front of each sales slip 10 by manually setting in the conventional numbering wheel digits or, in the alternative, the numbering wheel digits may be indexed by suitable means indexed by the information supplied from keyboard 30.

Reference may now be made to FIGS. 2-8 wherein there is illustrated a preferred embodiment of the present invention. The apparatus illustrated herein emboss prints the front face of each copy of the standard sales or credit slip while also printing the same information on the reverse side of the credit card issuer's copy of the sales slip in a form which is compatible with currently available optical character recognition (OCR) equipment. Thus, the credit card issuer's copy of the sales slip with the complete transaction information on the reverse side thereof can be used for completely automatic data processing without the need for manually entering the transaction information from the front face of the sales slip as in the prior art. While the preferred embodiment herein is illustrated in connection with its compatibility with OCR equipment, it is to be understood that this is merely for illustration purposes and not to limit the scope of the invention. The transaction information on the reverse side of the credit card issuer's copy can if desired be in bar coded OCR or magnetic ink character recognition (MICR) encoding form.

Figure 5:
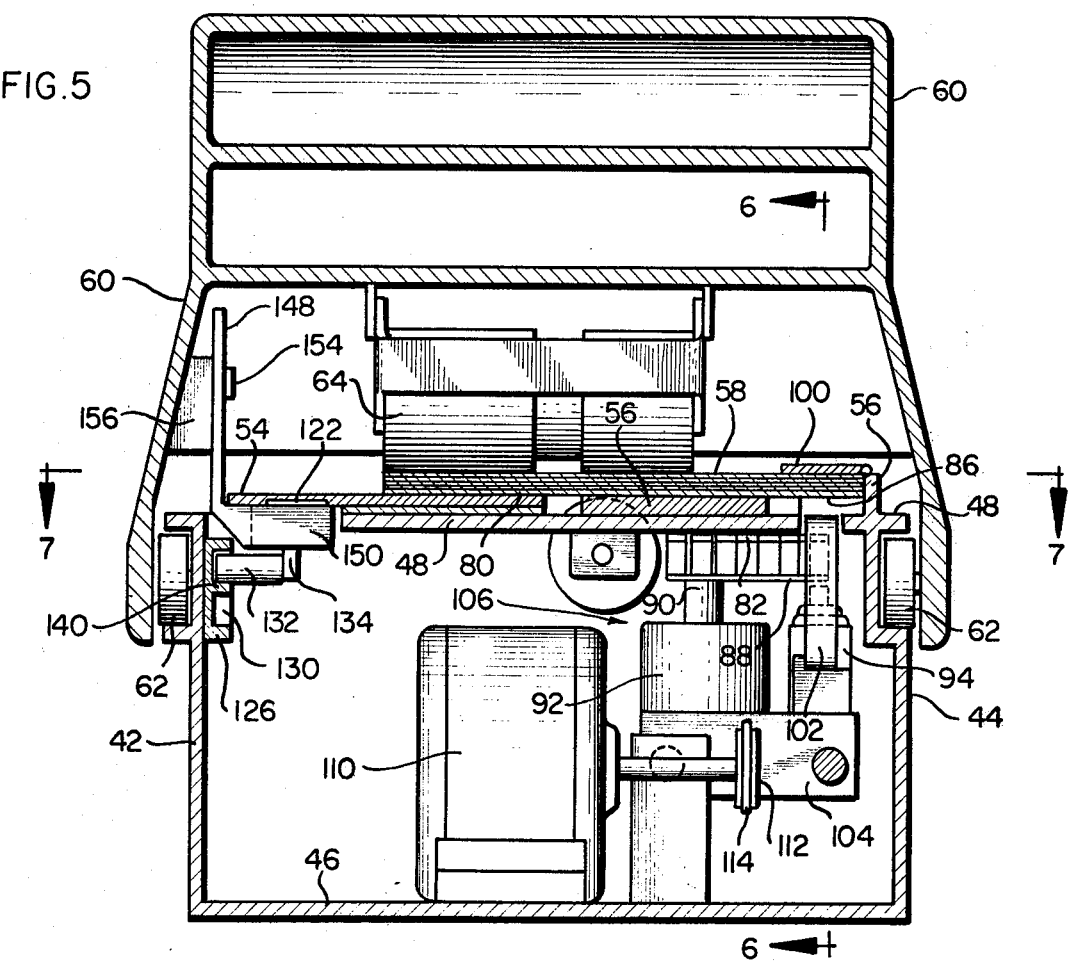
FIG. 5 is a sectional view taken along lines 5—5 of FIG. 4 illustrating the printing means for impact printing characters in machine readable form on the bottom of the last sales slip.
Figure 6:
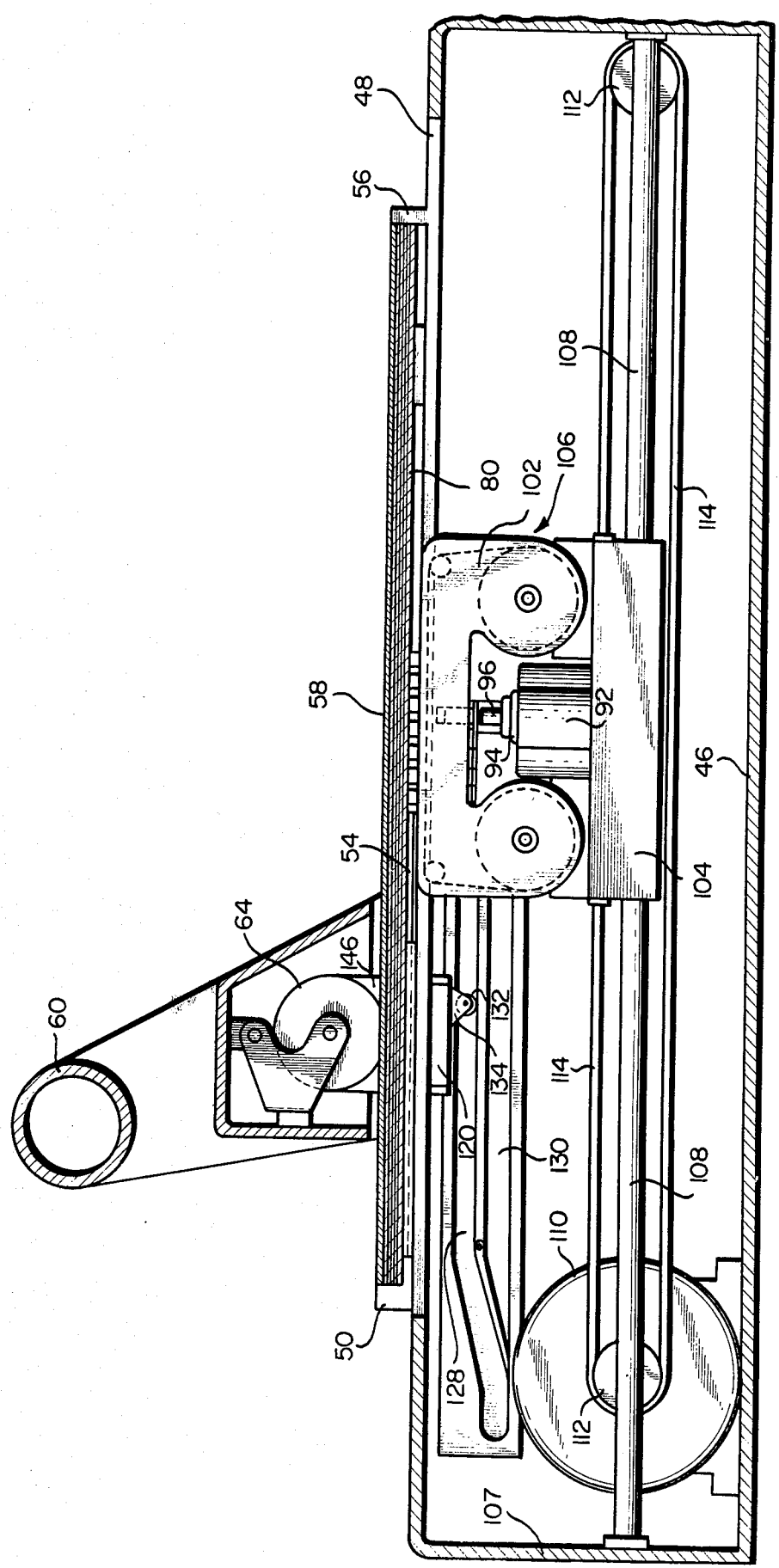
FIG. 6 is a sectional view taken along section lines 6—6 of FIG. 5 illustrating the magnetic head rollably mounted in its track, and the carriage mechanism for movement of the impact printer into position below the pack of sales slips.

The unique embosser/printer apparatus 40 of the present invention includes a rigid frame composed of respective side members 42, 44, base 46 and a top plate 48. Top plate 48 includes indexing shoulders 50, 52 for positionably locating a customer's credit card 54 and an additional indexing shoulder 56 for locating a set of sales slips 58 so that a portion overlies the credit card 54. A conventional embosser 60 is movably mounted to the frame sides 42 and 44 by means of wheels 62 mounted within tracks integrally formed in the respective frame sides as shown in FIG. 5. An embosser roller 64 rolls across the sales tickets 58 and a portion of the credit card 54 containing the customer's identification for printing this information on the front face on each of the sales tickets 58 as the embosser 60 is moved from one end to the other of the frame 40. It is to be understood that information identifying the merchant can be contained on a permanent merchant plate mounted on top plate 48 so as to be positioned below the designated area 66 on the front face of the sales slip 58. Similarly a resettable date plate can be mounted below the sales tickets in the designated space 68, such that upon movement of the embosser 60 from left to right as shown in FIG. 2, the merchant's indentification and the transaction date as well as the customer identification information at space 70 will be embossed printed on the front face of all of the sales tickets 58.

Figure 7:
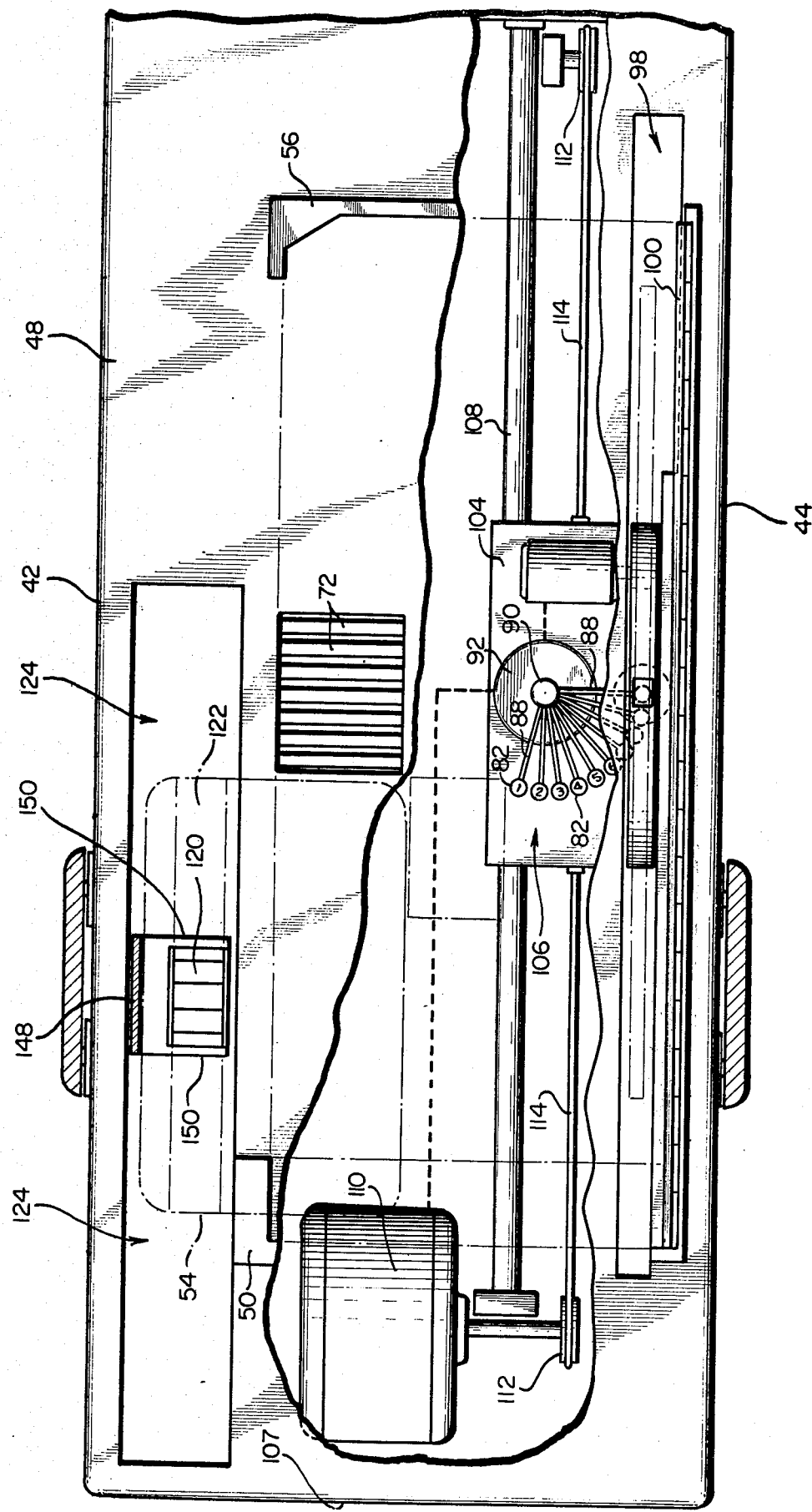
FIG. 7 is a sectional view taken along section lines 7—7 of FIG. 5, partially cut away to illustrate the magnetic read head in position below the credit card magnetic stripe, and the printer below the bottom of the last sales slip.

Referring to FIG. 7, there is illustrated a series of standard numbering wheels 72 each having digits 0 through 9. The numbering wheels may be set in a manner well-known to the transaction sale amount, so that upon movement of embosser 60, the total sale amount will appear in designated space 74 on the front face of the sale tickets 58 in a conventional manner.

As indicated in connection with the schematic illustration of FIG. 1, the unique apparatus of the present invention further includes means for printing the complete transaction information in machine readable form on the reverse side of the last sales ticket. As shown most clearly in FIGS. 5–6, the pack of sales tickets 58 includes one or more thin, onion skin sheets, and a relatively heavier, thicker, lowermost sales ticket 80 forming the credit card issuer's copy. In particular, print numerals 82 mounted below frame top plate 48 are adapted to print the transaction information in machine readable form on the reverse or bottom side 84 of the lowermost sales ticket 80. The transaction information, including the customer's identification, the merchant's identification, the transaction date and the sale amount, is indicated in OCR machine readable form at the designated location 86 illustrated in FIG. 3.

As shown in FIG. 7, each of the printing numerals 0-9 is attached to one end of an elongated arm 88, with the other end of each of the arms 88 being in turn connected to shaft 90 rotatably step driven by a stepping motor 92. Stepping motor 92 is suitably driven to rotate a desired printing numeral 82 into position immediately below the designated printing portion 86 on the bottom of sales ticket 80 as shown in FIG. 5.

Print solenoid 94 includes an actuating solenoid plunger 96 for driving the desired print numeral upwardly through slot 98 in top plate 48 to urge the printing numeral against printing portion 86. A printing platen 100 is hingedly mounted to shoulder 56 to overlie slot 98, the pack of sales tickets and the respective printing numeral so as to enable a clearly distinct and machine readable print font to be placed on the lower side of the sales ticket 80. A standard printing tape cartridge 102 enables the formation of clearly distinct and reliably machine scannable print font to be formed. As can be seen most clearly from FIG. 5, the cartridge 102 is replacably mounted and can be removed by simply raising printing platen 100 for insertion of a new cartridge.

A printing carriage 104 supporting the printing apparatus 106 is slidably mounted on a pair of bearing shafts 108 for movement between the frame ends 107, 109. Movement of the printing carriage 104 is provided by a stepping motor 110 coupled through a pair of rotatably driven pulleys 112 and an interconnecting belt 114. Thus, step actuation of stepping motor 110 will incrementally move printing carriage 104 along the bearing shafts 108 to place printing mechanism 106 in position to print the transaction information along the designated location 86 on the bottom 84 of the sales ticket 80.

The customer identification portion of the transaction information is obtained by moving a magnetic read head 120 adjacent a magnetic stripe 122 on the bottom side of credit card 54. Conventional credit cards issued by banks and some travel and entertainment companies contain the customer identification information both in a raised form for emboss printing the information on the front face of the credit card sales tickets described previously, and also in magnetic form such as magnetic stripe 122 on the reverse or bottom side of the card. Referring to FIGS. 2 and 7, a slot 124 is provided in top plate 48 so that when credit card 54 is positioned on the top plate, the magnetic stripe overlies slot and thus can be magnetically read by read head 120 as it scans the stripe.

Figure 4:
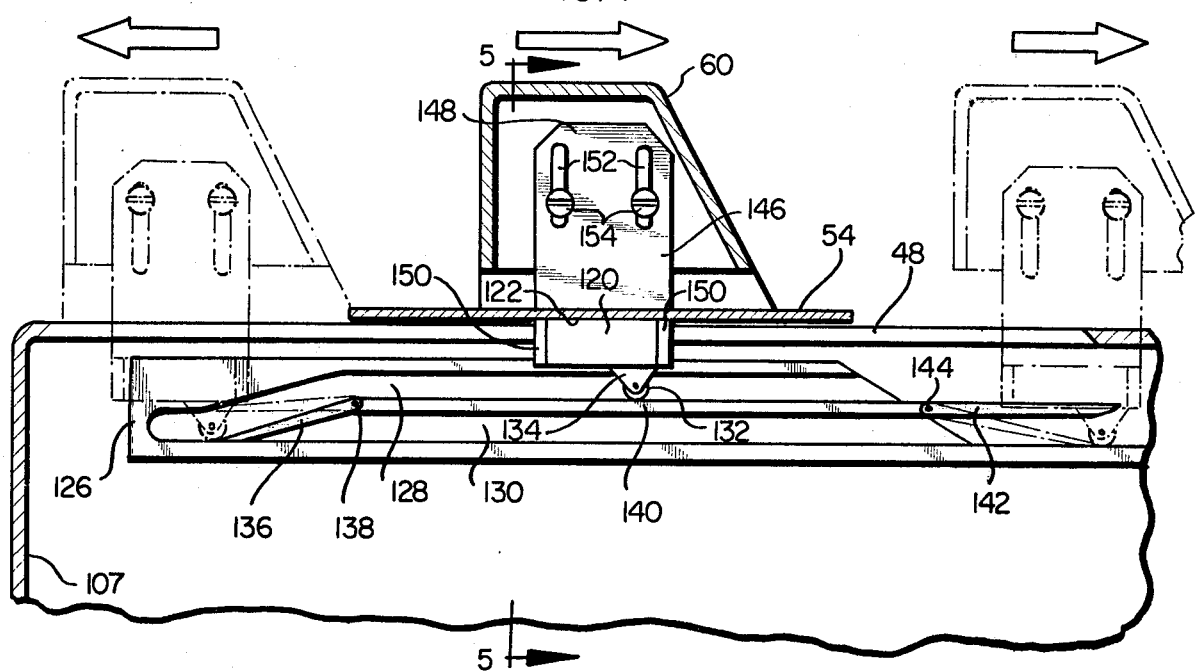
FIG. 4 is a sectional view taken along section line 4—4 of FIG. 2 illustrating a magnetic read head movable with the embossing means for reading the standard magnetic stripe on a credit card containing the customer identification information, with two end positions with the moving embosser and the magnetic head being shown in dashed lines.

Referring to FIGS. 4 and 5, there is illustrated in detail the mounting means for mounting the magnetic read head 120 in order that it may be moved in a scanning manner adjacent the magnetic stripe 122. In particular, a longitudinal member 126 is affixed to side 42 (see FIG. 5) and includes an upper track 128 and lower track 130 and accomodating a roller wheel 132 suitably mounted by bracket 134 to the bottom of the magnetic read head 120. Member 126 includes a first pivoting ramp 136 having one end 138 pivotally connected to a shelf portion 140 so that the ramp 136 is normally in the down position shown in the solid line position shown in FIG. 4. A second pivoting ramp 142 has an end 144 spring loaded to one end of shelf portion 140 so as to be in the normally up position shown in the solid line view of FIG. 4.

An L-shaped bracket 146 has an upright vertical portion 148 integrally formed with a pair of horizontal leg portions 150. The horizontal leg portions 150 rigidly mount on respective sides of the magnetic read head 120, while the upright vertical portion 148 includes a pair of slots 152 to accommodate screws 154 interconnecting the upright portion 148 to a mounting base 156 extending from the embosser 60. The shanks of screws 154 are sized with respect to slots 152 so that upright bracket 148 and the attached magnetic read head 120 can slide vertically to desirably position the read head with respect to the magnetic stripe 122.

FIG. 4 in the solid line views and the two dashed line views illustrates positioning the magnetic read head with respect to the credit card so as to read the customer identification information simultaneously with the emboss-printing of the same information on the front face of the credit card slips. The solid line view of FIG. 4 illustrates the magnetic read head moved in the reference arrow direction to scan the magnetic stripe 122, with the roller wheel 132 being guided within track 128. As the embosser 60 is continued to be moved in the indicated reference arrow direction toward the right, eventually roller wheel 132 engages pivoting ramp 142. The weight of bracket 146 and the read head 120 is sufficient to overcome the spring loading and pivot the ramp downwardly to the illustrated dashed line position so as to move wheel 132 into track 130. As soon as roller wheel 132 becomes disengaged from spring loaded ramp 142, the ramp springs back into its normal solid line position, so that pulling embosser 60 towards the lefthand side of FIG. 4 now enables the roller wheel 132 to be moved within track 130. In this position, shown in the dashed lines of FIG. 4, it may be noted that magnetic read head 120 is spaced from credit card 154 and is not in a position to reverse scan magnetic stripe 122. Continued movement of embosser 60 towards the left eventually raises ramp 136 to the dashed line position until roller wheel 132 disengages from the ramp and it is allowed to fall back to its normal solid line position.

Upon magnetically reading the customer's identification information on magnetic stripe 122, the information is stored electronically through suitable printing logic and thereafter activates printing mechanism 106 to print this information in machine readable form below the sales ticket 80.

The remaining transaction information relating to merchant identification, the sale amount and date of sale can be derived from a storage device similar to that used for temporary storage of the customer's information derived from magnetically scanning the credit card and is illustrated in FIG. 8, to be described in more particularity hereinafter. Alternatively, a keyboard input device 150 having an associated display 152 of light emitting diodes or liquid crystal elements is mounted on top plate 48 for entering the sale amount and/or date, and for semi-permanent storage of the merchants identification information.

Reference may now be made to FIG. 8 wherein there is illustrated in block diagram form a control unit containing the elements for sequential, selective controlling and transferring information required in connection with this unique embossing/printer unit. In particular, a microprocessor 160 comprising a central processor chip cooperating with clock 162 generating clock frequencies used by the microprocessor, operates in connection with bus controller 164 to supply the logic required to provide control signals for the complete system via the designated Address Bus, Data Bus, and Control Bus. A non-volatile memory 166 comprising a currently available EPROM, i.e., an erasable programmable read only memory, is used to store the system operating program. A temporary memory unit 168 comprising a volatile semi-conductor memory such as a currently available static RAM, i.e., random access memory, is used to store temporary information such as the customer identification, merchant's identification, and/or transaction date.

Magnetic stripe reader 170 includes the magnetic head 22 shown in FIG. 1 or the corresponding magnetic head 120 shown in FIGS. 2–7 and associated apparatus for converting the scanned magnetic information into electronic form for storage in the temporary memory 168 via the data bus under control of the microprocessor signals on the control bus and address bus. Transaction printer 172 includes the printing mechanism 106 shown in FIGS. 5–7 under control of printer control logic apparatus, 174. Printer control logic 174 interfaces the microprocessor with the transaction printer for transferring information from temporary memory 168, and if desired, from keyboard 176 through keyboard display interface 178. Display 180 includes the display elements 152 for displaying the information entered into keyboard 176 through the suitable interfacing equipment 178.

It is to be understood, of course, that the elements shown in block diagram form of FIG. 8 are standard, currently available elements comprising logic circuits, memory registers, etc. for providing the control instructions and the transfer of information in accordance with the teachings herein. If desired, the merchant identification information can be provided from a set of movable or programmable switches 182 associated with the designated space 66 and aligned with the corresponding portion of the top plate 48 to set in the merchant identification numbers. In this alternative embodiment, switch decoding logic apparatus 184 may be used to decode the switches 182 containing the variable merchant identification numbers, thereby providing this information on the data bus for temporary storage in memory 168 or for utilization by the printer control logic apparatus 174 to correspondingly provide this information in machine readable form at designated space 86 via the transaction printer 172.

Other conventional means, not illustrated, of capturing the customer information from the credit card such as embossed character recognition or optical character recognition could also be utilized.

While particular embodiments of the present invention have been shown and described, it will be obvious to those skilled in the art that various changes and modifications may be made with out departing from the invention in its broader aspects. Accordingly, the aim of the appended claims is to cover all such changes and modifications as may fall within the true spirit and scope of the invention.

What is claimed is:

1. Apparatus for preparing a packet of layered credit card sales tickets with transaction information in machine readable form, the packet including at least a topmost sales ticket for the credit card issuer, the customer's credit card having customer identification information on a raised character printing indicia portion on the credit card front side and in magnetic stripe on the reverse side thereof, said apparatus comprising:

a frame, having mounting positions locating the customer's credit card partially beneath said packet of sales tickets with said raised character printing indicia portion on the credit card front side underlying said packet and said magnetic stripe on the credit card reverse side being exposed beyond said packet;

manual embossing means, including an embosser movably mounted on said frame across said sales tickets and said underlying raised character printing indica portion on said credit card to emboss imprint the customer identification information on one side of said sales tickets;

a magnetic read head;

means mounting said magnetic read head to said embosser to lie below, immediately adjacent said exposed magnetic stripe on said credit card reverse side and magnetically readably scan said customer identification information on said exposed magnetic stripe as said embosser is moved across said credit card;

the magnetic readable scanning of said exposed magnetic stripe and the emboss imprinting of said sales tickets being accomplished in one simultaneous pass of said embosser and said magnetic read head across said credit card;

printing means movably mounted to said frame below said packet of sales tickets;

said printing means including an impact printer with machine readable indicia; and control means connected to said magnetic read head and said printing means for coupling said customer identification information from said magnetic read head to said impact printer to imprint said information in machine readable form on the bottom side of said lowermost sales ticket.

2. Apparatus according to claim 1, including movable carriage means for movably mounting said impact printer during printing.

* * * * *